Aug. 7, 1945. R. H. WAGNER ET AL 2,381,324
ELECTRIC TRACTION-MOTOR
Filed April 17, 1942 3 Sheets-Sheet 1

WITNESSES:

INVENTORS
Richard H. Wagner &
Erich O. Mueller.
BY
B. L. Zangwill
ATTORNEY

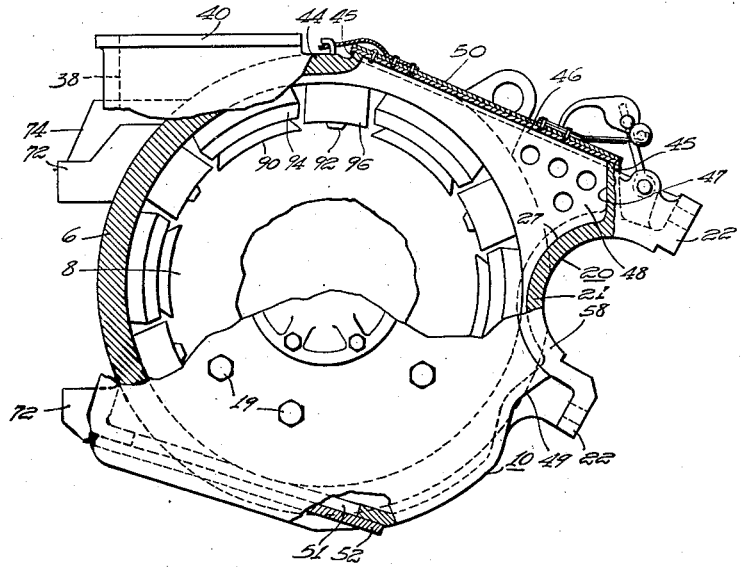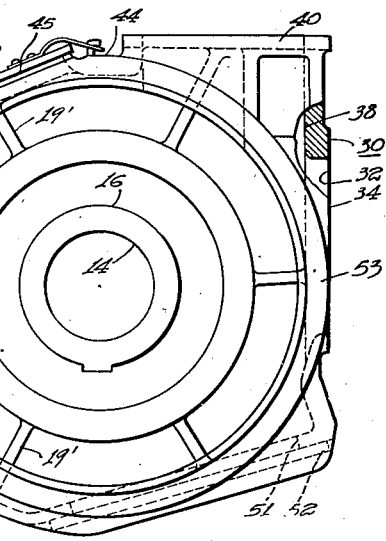

Aug. 7, 1945.   R. H. WAGNER ET AL   2,381,324
ELECTRIC TRACTION-MOTOR
Filed April 17, 1942   3 Sheets-Sheet 3

WITNESSES:

INVENTORS
Richard H. Wagner &
Erick O. Mueller.
BY
B. L. Zangwill
ATTORNEY

Patented Aug. 7, 1945

2,381,324

UNITED STATES PATENT OFFICE 2,381,324

ELECTRIC TRACTION-MOTOR

Richard H. Wagner, Edgewood, and Erich O. Mueller, Irwin, Pa., assignors to Westinghouse Electric Corporation, East Pittsburgh, Pa., a corporation of Pennsylvania Application April 17, 1942, Serial No. 439,356

15 Claims. (Cl. 172—286)

Our invention relates to electric motors, and is directed, more particularly, to an improved motor-frame for an axle-driving direct-current traction motor.

The frame of a motor generally comprises a frame-barrel and one or more end-housings for the frame-barrel. The motor-frame of a traction motor is, however, one of its heaviest parts, but must be relatively small so that the traction-motor can be mounted in a very limited space. The motor-frame must provide the necessary magnetic section for the high flux-densities used in relatively small-sized, high-power traction-motors. It must have means and the necessary strength for supporting or suspending the whole motor between the car-truck and car-axle. The motor-frame must include suitable openings for ventilating air and to permit access to the inside of the motor, which openings may require a relatively large area compared to the available exterior motor area. All these factors, and more, must be advantageously correlated if the motor is to be commercially desirable for traction use.

It is an object of our invention to provide a direct-current axle-supported traction-motor having a motor-frame which can be economically produced and which utilizes its cubic space-content to an exceptionally high degree, whereby the motor will have a very high power in relation to its cubic content and weight as compared to prior motors of the same general type.

It is a primary object of our invention to provide a motor-frame for a traction-motor of the class described, which is rigid and compact, and which is so formed that it can be easily produced and cheaply and accurately machined.

It is an important object of our invention to provide a motor-frame for a motor of the class described, comprising a one-piece end-casting combining both an end-housing or closure for the motor and a seat-support for an axle-bearing which supports the motor at the axle side.

It is an object of our invention to provide an axle-bearing-supported traction-motor frame which comprises for its stator a simple fabricated frame-barrel and a one-piece cast end-housing for the commutator or current-collecting end of the motor; the end-housing incorporating the more complicated parts of the motor-frame, that cannot be conveniently assembled by welding or securing parts of simple form together. This single end-casting supports the commutator-end armature bearing and provides a seat for the commutator-end motor-supporting axle-bearing.

Following the teachings of our invention, the frame-barrel comprises one or more hot-rolled steel plates fabricated into a cylinder; the plate or plates being of such thickness as to provide the necessary magnetic section and of sufficient strength to permit the motor suspension noses, lugs and axle-housing elements, through which the motor is supported on the car-truck and axle, to be easily welded together.

The end-casting is provided with a pair of similar air inlet-openings so that the motor can be adapted to different car ventilating systems now in use; a movable cover-plate being adapted to close that opennig which is not used. Two coverable access-openings are provided in the end-casting to permit access to the commutator-end of the motor. The end-casting is so formed as to provide enlarged regions therein for convenient manual manipulations therein; one of the access-openings being made somewhat larger by extening it along the motor-supporting axle-bearing seat portion of the casting so that the power conductors can be easily spliced or connected to the armature circuit conductors inside the motor-frame, and so that brushes and brushholders can be easily inspected and repaired.

The end-casting and frame-barrel, in accordance with our invention, can be welded, or otherwise secured, together and machined properly before the rest of the motor parts are assembled therein. This permits the resulting motor-frame to be bored for smooth and accurate pole and coil seats, and permits the supporting faces for the brushholder supports and commutator-end bearing to be accurately machined concentric with and perpendicular to the pole-seats, with all centers on a common axis.

Other objects, features and innovations of our invention, in addition to those previously recited, will be discernible from the following description thereof and the accompanying drawings which are limited to the essential features of our invention. In the drawings which are on various scales:

Fig. 3 is a transverse view of the stator of the motor, partly in elevation and partly in section;

Fig. 5 is an inside end elevational view of the one-piece end-casting, showing also cover means for one of its access-openings;

Figure 4:
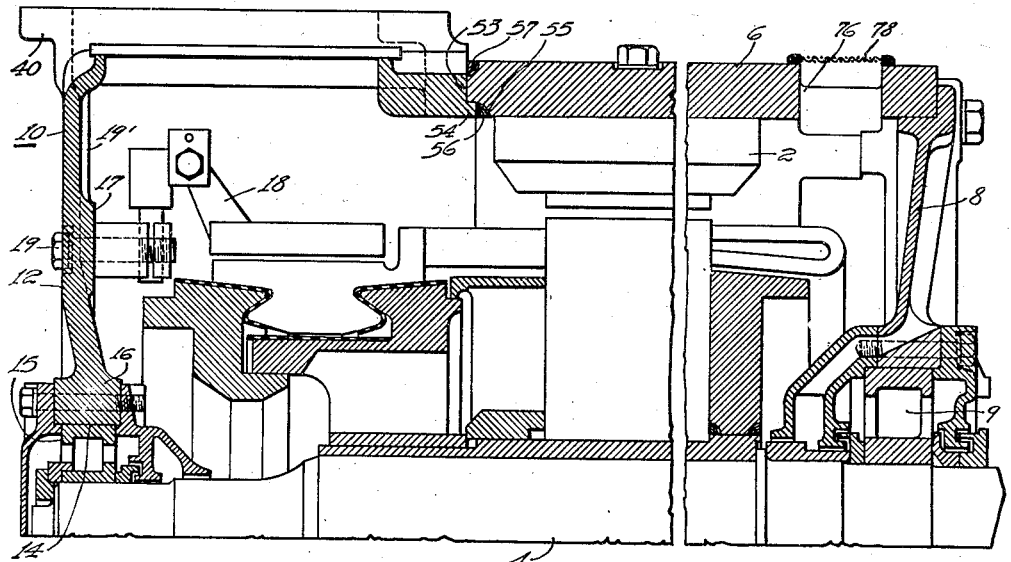
Fig. 4 is a schematic longitudinal or axial sectional view of part of the motor.

The illustrated motor, which constitutes a preferred form of our invention, comprises a motor-frame including a stator-member 2 and a rotor member 4 (Fig. 4) supported centrally within the stator-member for rotation about the axis of the motor, which is considered to be directed longitudinally of the motor. The stator-member comprises a stator-frame in the form of a frame-barrel 6 consisting of a single steel plate formed into a cylinder and having its abutting longitudinal edges welded together. The pinion end of the frame-barrel is closed by an end-plate 8, bolted thereto, having a suitable hole for the reception of a motor-bearing 9 for supporting that end of the rotor member 4; and the other end of the motor is closed by the one-piece housing or casting which constitutes an important part of our invention. This end-casting is for that end of the motor at which current is passed to the armature circuit. For convenience this end is called the commutator-end of the motor, because in this particular motor a commutator is used, but obviously a different type of motor may require another form of current-collecting means which we desire shall be included in the term "commutator," or the like.

Figure 6:
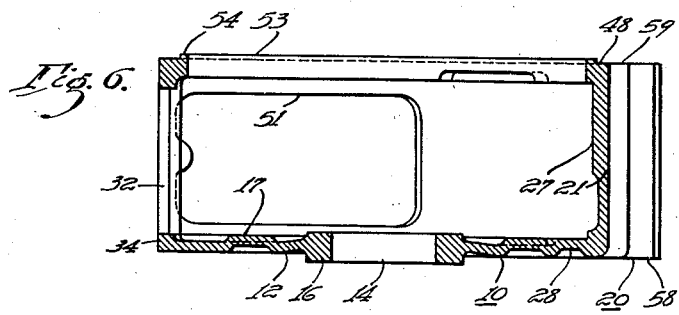
Fig. 6 is a sectional view looking downwardly on the lower half of the end-casting.

The end-casting is indicated in its entirety by the reference numeral 10 and comprises an outer end-wall 12 which is relatively generally flat or straight. This end-wall is provided with a central opening 14 for receiving a commutator-end motor-bearing 15, the part of the end-wall at the bearing being somewhat enlarged, radially and longitudinally, as shown at 16 (Figs. 4 and 6) for providing a strong bearing-support. The end-wall is further provided with an apertured internal projecting annular boss 17 for aligning brush-holders 18 secured thereto by bolt and nut means 19. Suitable spaced reenforcing ribs 19', on the inner side of the end wall 12, extend radially outwardly from the boss 17.

The end-casting 10 is cast with an integral axially extending motor-supporting side-wall portion 20 which extends for substantially the longitudinal or axial length of the end-casting, and has a suitable substantially semi-circular bearing-supporting portion 21 which comprises a seat for receiving a portion of a bearing which encircles the car-axle, and through which the motor is in part supported. The motor-supporting portion 20 has integral flanges or lugs 22 to which are bolted flanges or lugs 24 of an associated semi-circular bearing-supporting portion 26 interlocked with the portion 20 to form a circular seat for the axle-bearing through which the associated side of the motor is supported. The major part of the convex surface 27 of the semi-circular portion 21 projects inside the end-casting. The end-wall 12 has a tip wall-portion 28 extending to the associated extremity of the motor-supporting portion 20.

Figure 1:
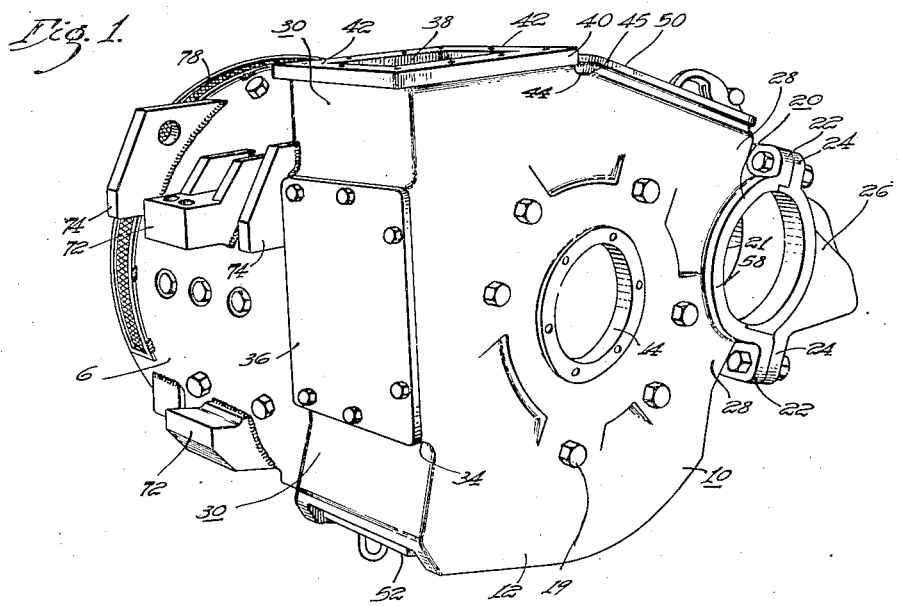
Figure 1 is a perspective view of the motor-frame, having the poles and brushholders secured therein.

The end-casting is provided with a relatively generally flat or straight axially extending side-wall 30 on the side opposite to the motor-supporting portion 20. This side-wall is substantially parallel to a diameter of the frame-barrel 6, extending somewhat beyond an end of this diameter; and is disposed somewhat outward, radially, from the frame-barrel 6, as more particularly shown in Fig. 1. This side-wall 30 is provided with a lateral intake ventilating-opening 32. The opening 32 is defined by a smooth rectangular seat 34 which may receive a cover 36. The opening 32 is slightly more than half the length of the side-wall 30 and is disposed approximately centrally thereof.

A second, or upper, intake ventilating-opening 38, which is substantially the same size as the lateral ventilating-opening 32, is provided in the top of the casting 10, by flanges 40 arranged to form a rectangular seat, similar to the seat 34, having outer smooth faces 42 for receiving the cover 36 when the lateral ventilating-opening 32 is used for ventilation instead of the upper ventilating-opening 38.

At the axle side of the upper ventilating-opening 38, the end-casting has a small cross-wall 44. Next to the cross-wall 44 is one end of a seat 45 about an upper access-opening 46 which extends to a small longitudinal side-wall 47 (Figs. 2, 3 and 5) which merges with the motor-supporting portion 20. The wall-portion 28 and a tip wall-portion 48, at the other, or frame-barrel, end of the end-casting, permit the access-opening 46 to be elongated, and cooperate with the wall-portion 47 and a somewhat similar wall-portion 49, to provide a somewhat enlarged interior space for easy and convenient access to the brushholders 18 and other suitable parts of the motor. The upper access-opening 46 is covered by a suitable removable cover plate 50. The upper access-opening 46 and the upper ventilating-opening 38 lie on the respective sides of an angle which is slightly less than a straight line while the planes of the ventilating-openings 32 and 38 are substantially perpendicular. A second, or bottom, access-opening 51 is provided in the bottom of the end-casting, the second access-opening 51 being covered by a removable cover means 52.

The end-casting has an inner end-wall 53, opposite to the outer end-wall 12, which is formed with a large hole having an internal diameter that is substantially the same as the internal diameter of the frame-barrel 6. This inner end-wall 53 includes the wall-portion 48. Consequently, the end-walls of the end-casting generally protrude transversely outward from the frame-barrel so as to include the substantially semi-circular portion 21. In order to secure the end-casting and frame-barrel together, the wall 53 is provided with a circular lip 54 (Figs. 4 and 6) providing a smooth finished circular shoulder which receives an abutting end of the frame-barrel 6, this end of the frame-barrel 6 being suitably cut away, as at 55, to provide a mating fit and interior welding-groove. An exterior welding groove is also provided in the frame-barrel so that the end-casting can be circumferentially welded to the frame-barrel on the interior and exterior of the motor-frame; an interior weld 56 and an exterior weld 57 being diagrammatically illustrated in Fig. 5. However, any other manner of securing the end-casting to the frame-barrel may be employed.

The motor-supporting portion 20 has opposite smooth-finished substantially semi-circular end faces 58 and 59 lying, respectively, in the outer and inner end-walls 12 and 53. The inner face 59 may be part of the shoulder provided by the lip 54. The motor-supporting portion 20 may be considered as a side-wall of the end-casting 10, having a concave arc outward and extending across or between the end-walls 12 and 53 whose lower portions terminate in similarly shaped arcs.

Figure 2:
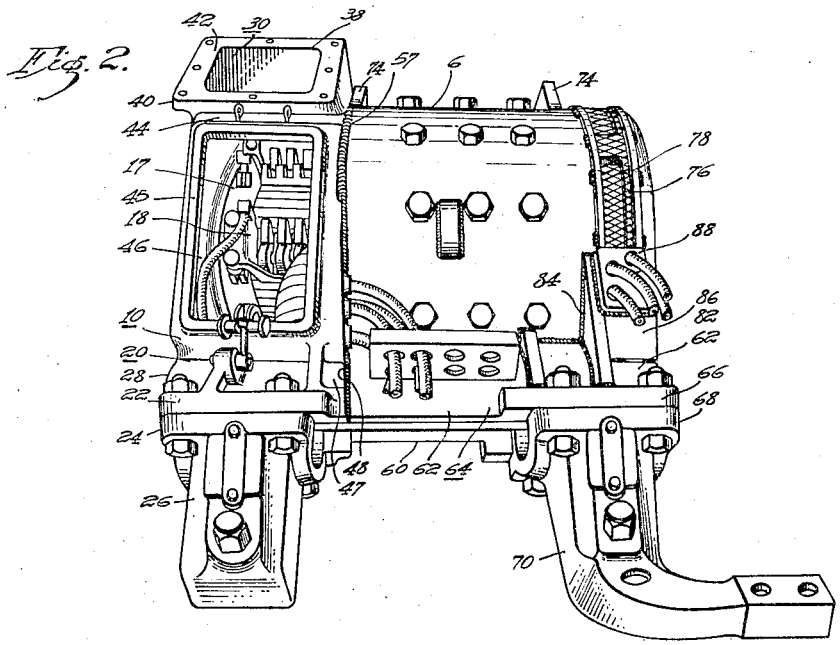
Figure 2 is a perspective view of the motor-frame from another angle, with the upper access-cover removed to show the brushholders in operative relation to the commutator.
Figure 7:
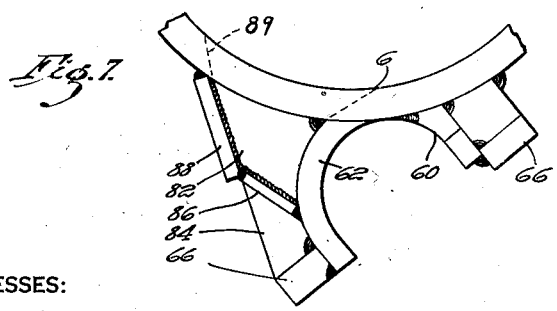
Fig. 7 is an enlarged elevational view of a detail of the motor-frame.

As shown in Figs. 2 and 7, an attachment is secured to the frame-barrel 6, in the form of a pair of curved members 60 and 62, which, in conjunction with the frame-barrel 6, form a motor-frame strengthening and axle-bearing-support portion 64 extending from the pinion end of the motor-frame to the end of the motor-supporting portion 20 which is in alignment therewith. The commutator ends of the axle-bearing-engaging members 60 and 62 are smooth finished and abut the smooth finished surface 59 at the frame-barrel end of the motor-supporting portion 20, along the end-wall 53 of the end-casting. The teachings of Patent No. 2,205,219 of January 18, 1940, to E. O. Mueller and D. B. Charters may be followed in forming the motor-supporting portion 64. The pinion end of the portion 64 is suitably formed and provided with lugs 66 (Fig. 2) which cooperate with lugs 68 on an associated interlocked axle-bearing portion 70 for forming a complete seat for the pinion-end axle-bearing through which the pinion-end of the motor is supported from the car-axle.

Suitable suspension noses 72 and safety noses 74 are welded to the motor-frame, through which the side of the motor, opposite the axle side, is supported; and the pinion-end of the frame barrel 6 has large ventilating openings 76 for outflowing ventilating air, these openings being covered by a screen member 78.

In order to conveniently connect power conductors to the armature circuit of the motor, which conductors may be of relatively large diameter for a high-power motor, the tip wall-portion 48 of the end-casting, which is opposite the tip wall-portion 28 of the end-wall 12, is provided with suitable holes 79 (Fig. 5) through which the outgoing conductors for the power conductors pass; and the enlarged interior part of the end-casting provided by the extended wall-portions 28 and 48 of the end-casting, which extend to the semi-circular portion 21, permits the conductors to be conveniently connected to the armature circuit comprising the brushes and interpoles of the motor.

In our invention, current for the field coils is supplied at the pinion end of the motor. Power conductors can be spliced to the outgoing field conductors inside a relatively small chamber formed between the curved member 62 and a plurality of plates 82, 84, 86 and 88, as more particularly shown in Figs. 2 and 7. The plates 82 and 84 are welded to the frame-barrel 6, the curved member 62 and a lug 66 so that added rigidity is imparted to the motor-frame. The plate 88 is over an opening 89 (Fig. 7) in the frame-barrel 6 so that the outgoing conductors can be easily reached by removing the pinion-end plate 8 of the motor, and can be readily passed through holes in the plate 88.

After the end-casting has been welded to the frame-barrel, the seats for the main poles and commutating interpoles can be very easily machined on a boring mill and at the same time the motor-bearing seats in the end-wall 12 can be accurately finished on the same line of centers. Moreover, the flat seat on the projection boss 17 of the end-wall 12, for receiving the brushholders 18, can be flat finished accurately, perpendicular to the aforesaid line of centers.

A motor in accordance with our invention utilizes the space in which it can be mounted very effectively, and in an actual embodiment a 650 horsepower motor was provided in a space previously substantially fully occupied by a 500 horsepower motor; while the weight per horsepower was decreased from about 14 pounds to 10 pounds for a six-pole direct current motor. A six-pole motor of this kind is somewhat schematically shown in Fig. 3 and comprises six main pole pieces 90 between which are disposed six commutating interpole pole pieces 92 with the respective coils 94 and 96 for these pole pieces very compactly arranged and formed to provide only the necessary longitudinal spaces required for adequate ventilation. In such a motor, six brushholders 18 are provided.

By combining the commutator-end axle-bearing motor-supporting portion and the end closure for the motor into a single cast housing or casting, a considerable reduction in cost and weight of the motor-frame is obtained. The tip wall-portions 28 and 48 of the one-piece casting provide a convenient internal pocket providing an enlarged access-space inside the end-casting, and enabling the access-openings to be elongated.

While we have shown our invention in a form which we now believe to be the best mode of application thereof, it is obvious that many modifications and equivalents can be made thereto.

We claim as our invention:

1. An electric traction-motor having an axis extending generally longitudinally of the motor, comprising a stator-frame having a cylindrical pole-supporting frame-barrel, and a cast end-casting secured to said frame-barrel, said end-casting comprising a motor-supporting portion, said end-casting having outer flattened surface portions providing a plurality of ventilating-openings extending generally longitudinally of the motor, a first of said ventilating-openings being substantially opposite to said motor-supporting portion, a second of said ventilating-openings being between said first ventilating-opening and said motor-supporting portion, said first and second ventilating-openings being substantially perpendicular to each other, said end-casting having closable access-openings between each ventilating opening and said motor-supporting portion.

2. A current-collector type electric traction-motor having an axis extending generally longitudinally of the motor, comprising a stator-frame having a cylindrical pole-supporting frame-barrel, and a cast end-casting secured to the current-collector end of said frame-barrel, said end-casting comprising a curved motor-supporting portion, said end-casting having outer flat surface portions providing a plurality of ventilating-openings extending generally longitudinally of the motor, a first of said ventilating-openings being substantially opposite to said motor-supporting portion, a second of said ventilating-openings being between said first ventilating-opening and said motor-supporting portion, said flat surface portions defining a pair of frame-like contours, each being substantially in a plane, the planes being in substantially right-angle relation, and closing means for one of said openings.

3. An axle-driving electric traction-motor having an axis extending generally longitudinally of the motor, said motor comprising a fabricated pole-supporting stator frame-barrel, and a separate one-piece cast end-housing secured to said frame-barrel, said cast end-housing extending longitudinally from said frame-barrel, said cast end-housing being provided with openings for ventilation and access to interior parts of the motor, said cast end-housing being formed with an end-wall transverse to the axis of the motor, said end-wall having an opening for a motor-bearing, said cast end-housing having an integral curved axle-bearing motor-supporting portion along one side thereof, extending in a longitudinal direction.

4. A current-collector type electric traction-motor having an axis extending longitudinally of the motor, comprising a pole-supporting stator-frame, and a one-piece end-casting secured to the current-collector end of said stator-frame, said end-casting extending longitudinally from said stator-frame, said end-casting being larger peripherally than said stator-frame, said end-casting having a substantially flat substantially longitudinally-extending side-wall provided with a first ventilating-opening, and having a second similar ventilating-opening having an end near said side-wall, said ventilating-openings being at an angle to each other, said end-casting having a substantially semi-circular axle-bearing motor-supporting portion longitudinally extending along the end-casting substantially opposite to the said first ventilating-opening the convex portion of said axle-bearing motor-supporting portion facing said first ventilating-opening, said end-casting having an access-opening extending between said second ventilating-opening and said axle-bearing motor-supporting portion, said access-opening having an end relatively close to said second ventilating-opening and another end near an end of said semi-circular axle-bearing motor-supporting portion, and cover means for one of said ventilating-openings and for said access-opening.

5. An end housing for the current-collector end of a current-collector type traction-motor, said housing having longitudinally extending walls and two transverse end-walls, one end-wall being provided with an opening for receiving a motor-bearing means, the other end-wall of said housing being provided with a relatively large opening for fitting a stator pole-supporting frame section, said longitudinally extending walls comprising a substantially flat wall provided with a first ventilating-opening, said housing having a second ventilating-opening somewhat similar to the said first ventilating-opening, said second ventilating-opening having and end near an end of said substantially flat wall, said housing having a substantially semi-circular axle-bearing motor-supporting portion longitudinally extending along the housing substantially opposite to the said first ventilating-opening, the convex portion of said axle-bearing motor-supporting portion being toward said first ventilating-opening, said housing having an access-opening extending between said second ventilating-opening and said axle-bearing motor-supporting portion, said access-opening having an end relatively close to said second ventilating-opening and another end near an end of said semi-circular axle-bearing motor-supporting portion.

6. The housing of claim 5 characterized by the housing being an integral one-piece casting.

7. An electric traction-motor of a current-collector type, comprising a pole-suporting stator-frame, and a one-piece end-casting secured to the current-collector end of said stator-frame, said end-casting extending longitudinally from said stator-frame, and being peripherally larger than said stator-frame, said end-casting having a substantially flat longitudinally-extending side-wall provided with a first ventilating-opening, and having a second ventilating-opening somewhat similar to the said first ventilating-opening, said second ventilating-opening having an end near an end of said side-wall, said end-casting having a substantially semi-circular axle-bearing motor-supporting portion longitudinally extending along the end-casting substantially opposite to the said first ventilating-opening, the convex portion of said axle-bearing motor-supporting portion being towards said first ventilating-opening, said end-casting having an access-opening extending between said second ventilating-opening and said axle-bearing motor-supporting portion, said access-opening having an end relatively close to said second ventilating-opening and another end near an end of said semi-circular axle-bearing motor-supporting portion, said end-casting having another access-opening between said side-wall and said axle-bearing motor-supporting portion, and cover means for one of said ventilating-openings and for both said access-openings.

8. An electric traction-motor of a current-collector type, comprising a pole-supporting stator-frame, and a one-piece end-casting secured to the current-collector end of said stator-frame, said end-casting extending longitudinally from said stator-frame, and being peripherally larger than said stator-frame, said end-casting having a substantially flat longitudinally-extending side-wall provided with a ventilating-opening, said end-casting comprising a side-wall providing a semi-circular axle-bearing motor-supporting portion, the convex portion of said axle-bearing motor-supporting portion being toward said first ventilating-opening, said end-casting having an access-opening extending between said ventilating-opening and said axle-bearing motor-supporting portion, said end-casting having an end-wall provided with holes near said axle-bearing motor-supporting portion, through which conductors for armature-connections are adapted to pass.

9. An electric traction-motor for driving a car axle, comprising a stator-member and a rotor-member, said rotor-member having a current-collecting mechanism at one end, said stator-member comprising a stator frame-barrel and a plurality of pole pieces and field coils therefor compactly arranged on said stator frame-barrel, said frame-barrel being provided with a ventilating air-outlet at the end of the motor opposite to the current-collecting end, a one-piece end-casting for enclosing the motor at the current-collecting end, brushholder means secured inside said end-casting for association with said current-collecting mechanism, said end-casting having a motor-supporting portion, said end-casting having an intake ventilating-opening and an access-opening near said motor-supporting portion, covering means for said access-opening, said end-casting having a wall near said motor-supporting portion on the side toward said stator-member said wall being provided with openings for receiving current-carrying conductors for the motor armature circuit, said conductor-openings being accessible through the said access-opening, a second motor-supporting portion secured to said frame-barrel, longitudinally aligned with said end-casting motor-supporting portion, plates cooperating with said second motor-supporting portion and said stator-member for providing an enlarged interior chamber, one of said plates and said frame-barrel having openings for receiving current-carrying conductors for said field coils.

10. A stator for an electric traction-motor of the type described, comprising a frame-barrel, and a one-piece end-casting secured to said stator-frame, said end-casting extending longitudinally from said frame-barrel, said end-casting being provided with openings for ventilation and access to interior parts of the motor, said end-casting having an end-wall, transverse to the axis for the motor, said end-wall having an opening for a motor-bearing, said end-casting having a motor-supporting portion along one side thereof, a second motor-supporting attachment secured to said frame-barrel, in alignment with the first said motor-supporting portion, said motor-supporting attachment abutting the first said motor-supporting portion and extending substantially for the length of said frame-barrel.

11. A current-collector type electric traction-motor having an axis extending longitudinally of the motor, comprising a fabricated pole-supporting stator-frame, and a one-piece end-casting secured to the current-collector end of said stator-frame, said end-casting extending longitudinally from said stator-frame, said end-casting being larger peripherally than said stator-frame, said end-casting having a substantially flat substantially longitudinally-extending side-wall provided with a first ventilating-opening, and having a second similar ventilating-opening having an end near said side-wall, said ventilating-openings being at an angle to each other, said end-casting having a substantially semi-circular axle-bearing motor-supporting portion longitudinally extending along the end-casting substantially opposite the said first ventilating-opening, the convex portion of said axle-bearing motor-supporting portion projecting inside said end-casting.

12. An electric traction-motor comprising a frame-barrel, a one-piece cast end-housing, said end-housing having a pair of spaced end-walls, one of said end-walls being provided with a large opening for receiving said frame-barrel in a manner to permit said end-housing and frame-barrel to be machined on a common line of centers, said end-housing having a plurality of axially extending walls connecting said end-walls, said axially extending walls being provided with ventilating and access-opening means, said end-walls having integrally cast portions extending outward beyond said large opening, said outwardly extending portions terminating in arcs which are concave outward.

13. An electric traction-motor having a current-collecting end, said motor comprising a stator frame-barrel, an end closure for said frame-barrel at said current-collecting end, said end closure comprising a one-piece casting including a motor-supporting means extending outwardly beyond said stator frame-barrel and extending in a longitudinal direction, said motor-supporting means comprising a substantially semi-circular portion, said one-piece casting comprising an outer end-wall provided with an inner annular boss for receiving a brush holder, and an inner end-wall having an opening of a size to receive said frame-barrel, whereby said frame-barrel and said one-piece casting can be machined on a common line of centers.

14. A current-collector type electric traction-motor of a type described, comprising a fabricated pole-supporting stator frame-barrel and a one-piece end-casting secured to the current-collector end of said stator-frame, said end-casting extending longitudinally from said stator frame-barrel, and being peripherally larger than said stator frame-barrel, said end-casting having a longitudinally-extending side-wall provided with a ventilating-opening, said end-casting comprising a side-wall providing a semi-circular axle-bearing motor-supporting portion, a convex portion of said axle-bearing motor-supporting portion projecting inside said end-casting, said end-casting having an access-opening extending between said ventilating-opening and said axle-bearing motor-supporting portion.

15. A stator member for an electric traction-motor having current-collecting end, said stator member comprising a frame-barrel, a one-piece casting as an end closure for said frame-barrel at said current-collecting end, said one-piece casting having spaced end-walls protruding radially outward further than said frame-barrel, said one-piece casting including a substantially semi-circular longitudinally-extending axle-bearing motor-supporting portion, said end-walls having integral portions extending to said axle-bearing motor-supporting portion, the inner one of said end-walls comprising an opening of a size for receiving said frame-barrel and providing a seat therefor, whereby machining may be done on said frame-barrel and said one-piece casting on a common line of centers.

RICHARD H. WAGNER.
ERICH O. MUELLER.